(12) United States Patent
Hwang et al.

(10) Patent No.: US 12,288,865 B2
(45) Date of Patent: Apr. 29, 2025

(54) PRE-LITHIATION APPARATUS

(71) Applicant: LG ENERGY SOLUTION, LTD., Seoul (KR)

(72) Inventors: Seung-Hae Hwang, Daejeon (KR); Ye-Ri Kim, Daejeon (KR); Oh-Byong Chae, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 363 days.

(21) Appl. No.: 17/419,470

(22) PCT Filed: Sep. 3, 2020

(86) PCT No.: PCT/KR2020/011893
§ 371 (c)(1),
(2) Date: Jun. 29, 2021

(87) PCT Pub. No.: WO2021/045545
PCT Pub. Date: Mar. 11, 2021

(65) Prior Publication Data
US 2022/0123276 A1    Apr. 21, 2022

(30) Foreign Application Priority Data
Sep. 6, 2019 (KR) .................. 10-2019-0110758

(51) Int. Cl.
*H01M 4/02* (2006.01)
*H01M 4/04* (2006.01)
*H01M 4/139* (2010.01)

(52) U.S. Cl.
CPC ......... *H01M 4/0459* (2013.01); *H01M 4/139* (2013.01); *H01M 2004/027* (2013.01)

(58) Field of Classification Search
CPC ........ C25B 9/00; C25B 15/00; H01M 4/0459; H01M 4/139; H01M 2004/027
See application file for complete search history.

(56) References Cited

U.S. PATENT DOCUMENTS

| 5,595,337 A | 1/1997 | Olsen et al. |
| 8,158,282 B2 | 4/2012 | Zhamu et al. |

(Continued)

FOREIGN PATENT DOCUMENTS

| CN | 105845894 A | 8/2016 |
| CN | 106159293 A | 11/2016 |

(Continued)

OTHER PUBLICATIONS

Extended European Search Report for European Application No. 20860071.8, dated Mar. 18, 2022.

(Continued)

*Primary Examiner* — Zulmariam Mendez
(74) *Attorney, Agent, or Firm* — Birch, Stewart, Kolasch & Birch, LLP

(57) ABSTRACT

A pre-lithiation apparatus which prevents an electrode from being damaged by the byproducts produced by contact between a lithium source, such as a lithium metal sheet or lithium metal powder, and an electrolyte for pre-lithiation. The pre-lithiation apparatus includes a first reaction vessel comprising a first electrolyte and a first organic solvent and a second reaction vessel comprising a second electrolyte and a second organic solvent, wherein the first electrolyte of the first reaction vessel and the second electrolyte of the second reaction vessel are linked to each other by a salt bridge. A negative electrode to be pre-lithiated is dipped at least partially in the first electrolyte of the first reaction vessel, and a lithium source capable of supplying lithium ions is dipped at least partially in the second electrolyte of the second reaction vessel.

16 Claims, 1 Drawing Sheet

(56) References Cited

U.S. PATENT DOCUMENTS

| | | |
|---|---|---|
| 2011/0278161 A1 | 11/2011 | Choi et al. |
| 2012/0018309 A1 | 1/2012 | Min et al. |
| 2014/0072836 A1* | 3/2014 | Mills .................. H01M 4/8626 |
| | | 429/422 |
| 2014/0102897 A1 | 4/2014 | Jerkiewicz et al. |
| 2015/0017543 A1 | 1/2015 | Lee et al. |
| 2016/0115600 A1* | 4/2016 | Stiller .................... C01B 32/20 |
| | | 252/502 |
| 2016/0246153 A1 | 8/2016 | Garcia et al. |
| 2018/0048020 A1* | 2/2018 | Zou ...................... H01M 4/364 |
| 2019/0181440 A1 | 6/2019 | Park et al. |
| 2020/0058929 A1 | 2/2020 | Chae et al. |

FOREIGN PATENT DOCUMENTS

| | | |
|---|---|---|
| CN | 109742325 A | 5/2019 |
| JP | 2015-187949 A | 10/2015 |
| JP | 2017-526106 A | 9/2017 |
| KR | 10-2011-0125328 A | 11/2011 |
| KR | 10-2012-0010414 A | 2/2012 |
| KR | 10-2014-0111622 A | 9/2014 |
| KR | 10-2019-0017149 A | 2/2019 |
| KR | 10-2019-0030345 A | 3/2019 |
| KR | 10-2019-0078525 A | 7/2019 |
| KR | 10-2019-0083304 A | 7/2019 |
| WO | WO 2015/192051 A1 | 12/2015 |
| WO | WO 2017/178108 A1 | 10/2017 |

OTHER PUBLICATIONS

Holtstiege et al., "Pre-Lithiation Strategies for Rechargeable Energy Storage Technologies: Concepts, Promises and Challenges," MDPI, vol. 4, No. 1, Jan. 23, 2018, 39 pages.

International Search Report (PCT/ISA/210) issued in PCT/KR2020/011893 mailed on Dec. 24, 2020.

* cited by examiner

---CONVENTIONAL ART---

PRE-LITHIATION APPARATUS

TECHNICAL FIELD

The present disclosure relates to a pre-lithiation apparatus.

The present application claims priority to Korean Patent Application No. 10-2019-0110758 filed on Sep. 6, 2019 in the Republic of Korea, the disclosures of which are incorporated herein by reference.

BACKGROUND ART

In the field of lithium secondary batteries, a pre-lithiation process refers to a process for preliminary lithiation of an electrode, particularly a negative electrode, to a predetermined level. Such a pre-lithiation process has been carried out by using a lithium metal sheet or lithium metal powder as a lithium source and allowing the lithium metal sheet or lithium metal powder to be in contact with a negative electrode in an electrolyte.

FIG. 1 illustrates an embodiment of a pre-lithiation reaction vessel configured to carry out a pre-lithiation process according to the related art. Referring to FIG. 1, the pre-lithiation reaction vessel 100 includes a container 110 in which a lithium source-containing electrolyte 120 is received, and a negative electrode 130 to be pre-lithiated and lithium metal 140 as a lithium source are dipped in the electrolyte 120 and are in contact with each other therein.

The present inventors have focused on the problems generated when a lithium source, such as a lithium metal sheet or lithium metal powder, is dipped at least partially in an electrolyte used for pre-lithiation and is in contact with a negative electrode, the problems including reaction of the electrolyte with the lithium source and production of byproducts, which cause damage upon the solid electrolyte interphase (SEI) layer on the negative electrode surface. In addition, such byproducts may cause side reactions during the charge/discharge of a finished lithium secondary battery. In this case, available lithium is consumed continuously to cause degradation of the cycle capacity retention of a lithium secondary battery.

DISCLOSURE

Technical Problem

The present disclosure is designed to solve the problems of the related art, and therefore the present disclosure is directed to providing a pre-lithiation apparatus which can control the effect of byproducts produced by direct contact between a lithium source, such as a lithium metal sheet or lithium metal powder, and an electrolyte for pre-lithiation.

The present disclosure is also directed to providing a lithium secondary battery which uses a negative electrode pre-lithiated by using the pre-lithiation apparatus and thus shows improved performance.

Technical Solution

In one aspect of the present disclosure, there is provided a pre-lithiation apparatus according to any one of the following embodiments. According to the first embodiment of the present disclosure, there is provided a pre-lithiation apparatus including a first reaction vessel comprising a first electrolyte and a first organic solvent and a second reaction vessel comprising a second electrolyte and a second organic solvent, wherein the first electrolyte of the first reaction vessel and the second electrolyte of the second reaction vessel are linked to each other by a salt bridge, wherein the salt bridge includes a third electrolyte and a third organic solvent, wherein a negative electrode to be pre-lithiated is dipped at least partially in the first electrolyte of the first reaction vessel, and a lithium source capable of supplying lithium ions is dipped at least partially in the second electrolyte of the second reaction vessel.

According to the second embodiment of the present disclosure, there is provided the pre-lithiation apparatus as defined in the first embodiment, wherein the total ion concentration of the salt bridge is higher than the total ion concentration of the first electrolyte of the first reaction vessel and the second electrolyte of the second reaction vessel.

According to the third embodiment of the present disclosure, there is provided the pre-lithiation apparatus as defined in the first or the second embodiment, wherein the electrolyte of the salt bridge has a concentration of from 3 M to 50 M.

According to the fourth embodiment of the present disclosure, there is provided the pre-lithiation apparatus as defined in any one of the first to the third embodiments, wherein the third organic solvent has the same composition as at least one of the first organic solvent contained in the first reaction vessel or the second organic solvent contained in the second reaction vessel; or both.

According to the fifth embodiment of the present disclosure, there is provided the pre-lithiation apparatus as defined in any one of the first to the fourth embodiments, wherein the salt bridge includes a glass tube filled with the third organic solvent and the third electrolyte wherein the third organic solvent and the third electrolyte are gelled with agar.

According to the sixth embodiment of the present disclosure, there is provided the pre-lithiation apparatus as defined in any one of the first to the fifth embodiments, wherein the third electrolyte is at least one of KCl, NaCl, $KNO_3$ or $Na_2SO_4$.

According to the seventh embodiment of the present disclosure, there is provided the pre-lithiation apparatus as defined in any one of the first to the six embodiments, wherein the salt bridge has an ion conductivity of 5 mS/cm to 10 mS/cm.

According to the eighth embodiment of the present disclosure, there is provided the pre-lithiation apparatus as defined in any one of the first to the seventh embodiments, wherein the lithium source is at least one of a lithium metal sheet or lithium metal powder.

According to the ninth embodiment of the present disclosure, there is provided the pre-lithiation apparatus as defined in any one of the first to the eighth embodiments, wherein at least one of the first electrolyte of the first reaction vessel and the second electrolyte of the second reaction vessel includes propyl propionate.

In another aspect of the present disclosure, there is also provided a negative electrode for a lithium secondary battery obtained by using the pre-lithiation apparatus as defined in the first embodiment.

Advantageous Effects

In the pre-lithiation apparatus according to the present disclosure, a lithium source for pre-lithiation and a negative electrode to be pre-lithiated are disposed in different reaction vessels, and byproducts produced by contact between the lithium source and the electrolyte are not introduced to the reaction vessel, in which the negative electrode is disposed, by virtue of a salt bridge, and thus the byproducts are not introduced to the negative electrode and do not contaminate the negative electrode.

Therefore, it is possible to prevent the problem of degradation of capacity retention, caused by side reactions generated in a lithium secondary battery due to the byproducts.

BEST MODE

Figure 1:
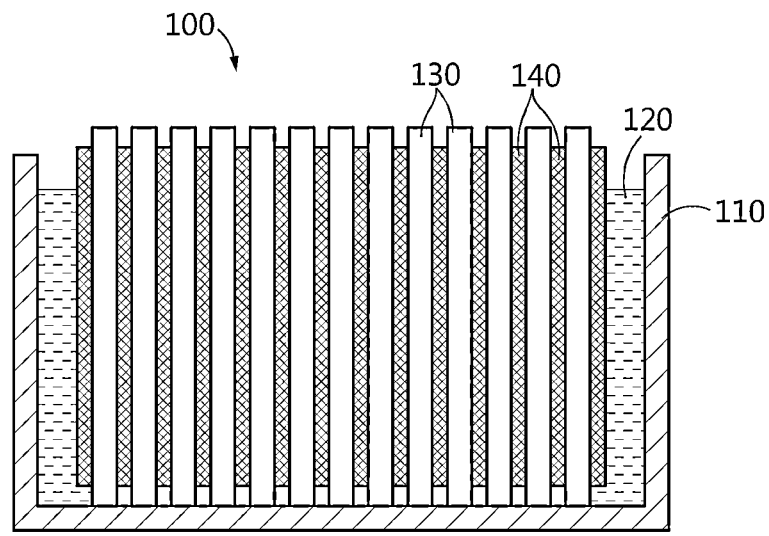
FIG. 1 is a schematic view illustrating the pre-lithiation apparatus according to an embodiment of the related art.
Figure 2:
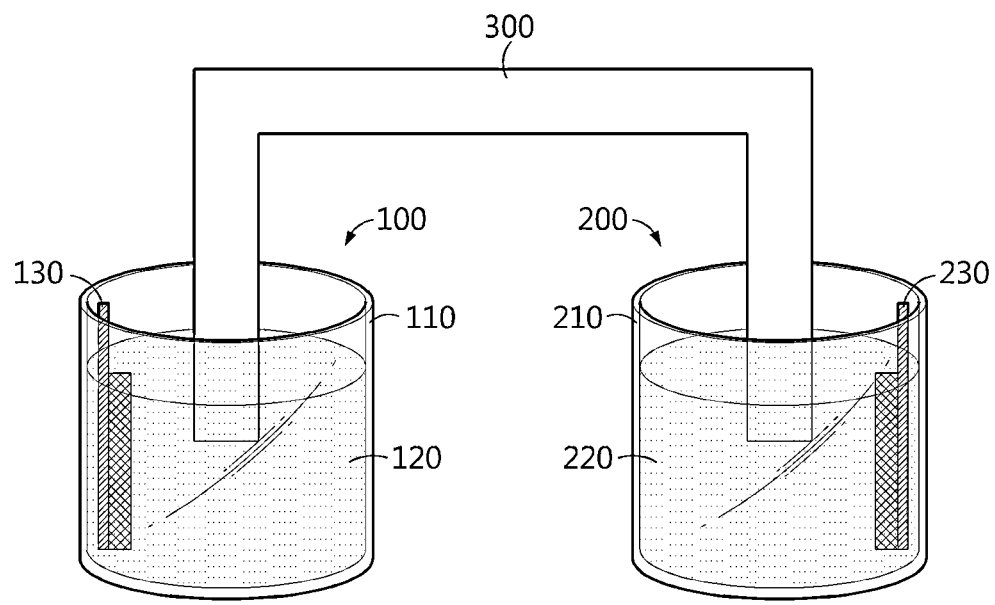
FIG. 2 is a schematic view illustrating the pre-lithiation apparatus according to an embodiment of the present disclosure.

Hereinafter, preferred embodiments of the present disclosure will be described in detail with reference to FIG. 2.

In one aspect of the present disclosure, there is provided a pre-lithiation apparatus which includes two reaction vessels having a first reaction vessel 100 and a second reaction vessel 200, wherein the electrolyte 120 of the first reaction vessel and the electrolyte 220 of the second reaction vessel are linked to each other by a salt bridge 300, the salt bridge includes an electrolyte and an organic solvent, a negative electrode 130 to be pre-lithiated is dipped at least partially in the electrolyte 120 of the first reaction vessel, and a lithium source 230 capable of supplying lithium ions is dipped at least partially in the electrolyte 220 of the second reaction vessel.

According to an embodiment of the present disclosure, the salt bridge may be provided in the form of a glass tube filled with an organic solvent and an electrolyte which are gelled with agar. Rapid ion transfer of positive or negative charges is preferred so that the salt bridge may not function as resistance during pre-lithiation. For example, KCl salt formed by binding of highly ion conductive potassium ions (K$^+$) with chloride ions (Cl$^-$) may be used as an electrolyte of the salt bridge. In addition, a salt having a high concentration is used in the form of gel suitably in order to carry out rapid ion transfer. For example, the salt may have a high concentration of 3 M or more. In addition, in most cases of the mass transfer between the salt bridge and the electrolyte, charged ions are transferred in order to make a charge balance. Even when byproducts are produced by side reactions, they have a low concentration and diffusion caused by a difference in concentration hardly occurs. Therefore, there is no adverse effect of the byproducts produced by side reactions occurring in the pre-lithiation according to the related art.

According to an embodiment of the present disclosure, the organic solvent contained in the salt bridge may have the same ingredients and composition as the organic solvent of the first reaction vessel or the second reaction vessel. When the organic solvent contained in the salt bridge has the above-mentioned characteristic, other ingredients cannot be introduced to the electrolyte, thereby providing an advantageous effect in that the ingredients of a solid electrolyte interphase (SEI) layer are not changed.

According to an embodiment of the present disclosure, non-limiting examples of the electrolyte include KCl, NaCl, KNO$_3$, Na$_2$SO$_4$, or a mixture of two or more of them. Such electrolytes have high ion conductivity and are preferred as an electrolyte of the salt bridge.

According to an embodiment of the present disclosure, while the electrolyte of the first reaction vessel is designed to have a concentration of 0.1-2 M and the electrolyte of the second reaction vessel is designed to have a concentration of 0.1-2 M, the electrolyte of the salt bridge is designed to have a concentration of 3-50 M. In other words, the electrolyte of the salt bridge has a significantly higher concentration as compared to the concentration of each of the electrolyte of the first reaction vessel and the electrolyte of the second reaction vessel. When the electrolyte of the salt bridge has a higher concentration as compared to the concentration of each of the electrolyte of the first reaction vessel and the electrolyte of the second reaction vessel as mentioned above, ions can be transferred from the salt bridge to the electrolyte.

According to an embodiment of the present disclosure, the salt bridge may have an ion conductivity of 5-50 mS/cm, 5-10 mS/cm, 10-50 mS/cm, or 20-30 mS/cm. When the salt bridge has an ion conductivity less than the lower limit, it has a lower ion conductivity as compared to the electrolyte for pre-lithiation to cause the problem of a decrease in reaction rate.

According to an embodiment of the present disclosure, the lithium source may be a lithium metal sheet, lithium metal powder, or a combination thereof.

According to an embodiment of the present disclosure, the electrolyte of the first reaction vessel may have the same composition as the electrolyte of the second reaction vessel. More particularly, the first reaction vessel and the second reaction vessel may have the same ingredients and composition of the organic solvent, and the same ingredients and composition of the lithium salt. When the electrolyte of the first reaction vessel and the electrolyte of the second reaction vessel have the same composition, the same electrolyte as the electrolyte of the first reaction vessel and the electrolyte of the second reaction vessel may be used for the salt bridge, thereby avoiding contamination of the electrolyte.

According to an embodiment of the present disclosure, non-limiting examples of the organic solvent used for the electrolyte of each of the first reaction vessel, the second vessel and the salt bridge independently include N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or a mixture of two or more of them.

According to an embodiment of the present disclosure, the electrolyte of each of the first reaction vessel, the second reaction vessel and the salt bridge may further include an additive. Non-limiting examples of the additive include propyl propionate, vinylene carbonate, vinyl ethylene carbonate, fluoroethyl carbonate, salicylic acid, LiBF$_4$, LITFSL, LiBOB, LiODFB, pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride, carbon tetrachloride, trifluoroethylene, carbon dioxide gas, fluoro-ethylene carbonate (FEC), propene sultone (PRS), or the like.

According to an embodiment of the present disclosure, each of the first reaction vessel and the second reaction vessel may independently include a lithium salt, and the lithium salt may be LiCl, LiBr, LiI, LiClO$_4$, LiBF$_4$, LiB$_{10}$Cl$_{10}$, LiPF$_6$, LiFSI, LiTFSI, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lower aliphatic lithium carboxylates, lithium 4-phenylborate, or a mixture of two or more of them.

According to an embodiment of the present disclosure, the negative electrode includes, as a negative electrode active material, a carbonaceous material and/or Si.

The carbonaceous material may be crystalline artificial graphite, crystalline natural graphite, amorphous hard carbon, low-crystalline soft carbon, carbon black, acetylene black, Ketjen black, Super P, graphene, fibrous carbon, or a mixture of two or more of them, and preferably may be crystalline artificial graphite and/or crystalline natural graphite.

In general, the negative electrode is obtained by applying an electrode mixture including a negative electrode active material, conductive material and a binder to a negative electrode current collector, and carrying out drying. If necessary, the mixture may further include a filler.

Besides the above-mentioned materials, particular examples of the negative electrode active material include a metal composite oxide, such as Li$_x$Fe$_2$O$_3$ (0≤x≤1), LixWO$_2$ (0≤x≤1), Sn$_x$Me$_{1-x}$Me'$_y$O$_z$ (Me: Mn, Fe, Pb, Ge; Me': Al, B, P, Si, an element of Group 1, Group 2 or Group 3 in the Periodic Table, or halogen; 0<x≤1; 1≤y≤3; 1≤z≤8), or the like; lithium metal; lithium alloy; silicon-based alloy; tin-based alloy; metal oxide, such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$, or the like; a conductive polymer, such as polyacetylene; a Li—Co—Ni type material; titanium oxide; lithium titanium oxide, or the like. Particularly, the negative electrode active material may include a carbonaceous material and/or Si.

In general, the negative electrode current collector generally has a thickness of 3-500 μm. The negative electrode current collector is not particularly limited, as long as it has conductivity, while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, similarly to the positive electrode current collector, fine surface irregularities may be formed on the surface of the electrode current collector to reinforce the binding force to the negative electrode active material. The negative electrode current collector may be used in various shapes, including a film, sheet, foil, net, porous body, foamed body, non-woven web, or the like.

The conductive material is added generally in an amount of 1-50 wt % based on the total weight of the mixture including the negative electrode active material. Such a conductive material is not particularly limited, as long as it has conductivity, while not causing any chemical change in the corresponding battery. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whiskers, such as zinc oxide or potassium titanate; conductive metal oxide, such as titanium oxide; conductive materials, such as a polyphenylene derivative; or the like.

Meanwhile, a graphitic material having elasticity may be used as a conductive material, optionally in combination with the above-mentioned materials.

The binder is an ingredient which assists binding of the active material with the conductive material and binding to the current collector, and is added generally in an amount of 1-50 wt %, based on the total weight of the mixture including the negative electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like.

The filler is an ingredient which inhibits swelling of the negative electrode and is used optionally. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

In another aspect of the present disclosure, there is provided a pre-lithiated negative electrode, obtained by using the pre-lithiation apparatus.

In still another aspect of the present disclosure, there is provided a secondary battery which includes an electrode assembly including the pre-lithiated negative electrode, a positive electrode and a separator interposed between the pre-lithiated negative electrode and the positive electrode, and an electrolyte injected thereto. The secondary battery may be a lithium ion battery, lithium ion polymer battery, or a lithium polymer battery.

In general, the lithium secondary battery includes a positive electrode, a negative electrode, a separator interposed between the positive electrode and the negative electrode, and a lithium salt-containing non-aqueous electrolyte. Hereinafter, the other ingredients of the lithium secondary battery will be explained.

The positive electrode may be obtained by applying and drying a positive electrode active material on a positive electrode current collector, followed by pressing. If necessary, the above-mentioned conductive material, binder, filler, or the like, may be used additionally.

According to an embodiment of the present disclosure, the positive electrode may include, as a positive electrode active material, a lithium transition metal oxide represented by the following Chemical Formula 1 or Chemical Formula 2.

$$Li_xM_yMn_{2-y}O_{4-z}A_z \qquad \text{[Chemical Formula 1]}$$

wherein M is Al, Mg, Ni, Co, Fe, Cr, V, Ti, Cu, B, Ca, Zn, Zr, Nb, Mo, Sr, Sb, W, Ti, Bi or a mixture of two or more of them;

A is at least one monovalent or divalent anion;

0.9≤x≤1.2; 0<y<2; and 0≤z≤0.2.

$$(1-x)LiM'O_{2-y}A_y\text{-}xLi_2MnO_{3-y'}A_{y'} \qquad \text{[Chemical Formula 2]}$$

wherein M' is Mn$_a$M$_b$;

M is Ni, Ti, Co, Al, Cu, Fe, Mg, B, Cr, Zr, Zn, or a mixture of two or more of them;

A is at least one selected from the anions consisting of PO$_4$, BO$_3$, CO$_3$, F and NO$_3$;

0<x<1; 0<y≤0.02; 0<y'≤0.02; 0.5≤a≤1.0; 0≤b≤0.5; and a+b=1.

In addition to the lithium transition metal oxides represented by the above Chemical Formula 1 or Chemical Formula 2, particular examples of the positive electrode active material may include, but are not limited to: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure, represented by $LiNi_xMn_{2-x}O_4$; $LiMn_2O_4$ in which Li is partially substituted with an alkaline earth metal ion; disulfide compounds; $Fe_2(MoO_4)_3$; or the like.

The positive electrode current collector generally has a thickness of 3-500 μm. The positive electrode current is not particularly limited, as long as it has high conductivity, while not causing any chemical change in the corresponding battery. Particular examples of the positive electrode current collector include stainless steel, aluminum, nickel, titanium, baked carbon, or aluminum or stainless steel surface-treated with carbon, nickel, titanium, silver, etc., or the like. The positive electrode current collector may be used in various shapes, including a film, sheet, foil, net, porous body, foamed body, non-woven web, or the like.

The separator is interposed between the positive electrode and the negative electrode, and a thin film-type insulating separator having high ion permeability and mechanical strength may be used. In general, the separator may have a pore diameter of 0.01-10 μm and a thickness of 5-300 μm. Particular examples of the separator include sheets or non-woven webs made of an olefinic polymer, such as polypropylene, having chemical resistance and hydrophobicity; glass fibers or polyethylene, or the like. When a solid electrolyte, such as a polymer, is used as an electrolyte, the solid electrolyte may also function as a separator.

The lithium salt-containing non-aqueous electrolyte includes a non-aqueous electrolyte and lithium, and the non-aqueous electrolyte that may be used include a non-aqueous organic solvent, organic solid electrolyte, inorganic solid electrolyte, or the like, but is not limited thereto.

Particular examples of the non-aqueous organic solvent include aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or the like.

Particular examples of the organic solid electrolyte include polyethylene derivatives, polyethylene oxide derivatives, polypropylene derivatives, phosphate polymers, polyagiation lysine, polyester sulfide, polyvinyl alcohol, polyvinylidene fluoride, polymers containing an ionically dissociable group, or the like.

Particular examples of the inorganic solid electrolyte include Li nitrides, halides, sulfates, or the like, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salt is a substance that can be dissolved easily in the non-aqueous electrolyte. Particular examples of the lithium salt include $LiCl$, $LiBr$, $LiI$, $LiClO_4$, $LiBF_4$, $LiB_{10}Cl_{10}$, $LiPF_6$, $LiFSI$, $LiTFSI$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylates, lithium 4-phenylborate, imide, or the like.

In addition, the lithium salt-containing non-aqueous electrolyte may further include additives, such as pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride, in order to improve the charge/discharge characteristics, flame resistance, or the like. Optionally, the lithium salt-containing non-aqueous electrolyte may further include a halogen-containing solvent, such as carbon tetrachloride or trifluoroethylene, in order to impart non-combustibility. The lithium salt-containing non-aqueous electrolyte may further include carbon dioxide gas in order to improve the high-temperature storage characteristics. In addition, the lithium salt-containing non-aqueous electrolyte may further include fluoro-ethylene carbonate (FEC), propene sultone (PRS), or the like.

In yet another aspect of the present disclosure, there are provided a battery module including the secondary battery as a unit cell, a battery pack including the battery module, and a device including the battery pack as a power source.

Particular examples of the device include an electric vehicle, hybrid electric vehicle, plug-in hybrid electric vehicle, power storage system, or the like, but are not limited thereto.

Hereinafter, the present disclosure will be explained in more detail with reference to Examples and Test Examples. This disclosure may, however, be embodied in many different forms and should not be construed as limited to the exemplary embodiments set forth therein. It will be apparent that these exemplary embodiments are provided so that the present disclosure will be complete and understood easily by those skilled in the art.

Example 1

<Preparation of Salt Bridge>

As a salt bridge including an electrolyte and an organic solvent, 3 M KCl was used as an electrolyte and ethylene carbonate (EC)/propylene carbonate (PC)/propyl propionate (PP) mixed at a volume ratio of 3/1/6 was used as an organic solvent. The electrolyte and the organic solvent were mixed with each other and gelled with agar, and a glass tube was filled with the resultant product to prepare a salt bridge.

<Manufacture of Negative Electrode>

First, 81 wt % of graphite as a negative electrode active material, 9 wt % of SiO, 5 wt % of denka black (a conductive material), 3.5 wt % of styrene-butadiene rubber (SBR), and 1.5 wt % of CMC were added to water to prepare negative electrode mixture slurry. The negative mixture slurry was coated on a copper current collector and vacuum dried at 130° C., followed by pressing, to obtain a negative electrode.

<Pre-Lithiation Apparatus and Pre-Lithiation Process>

A pre-lithiation apparatus including two reaction vessels having a first reaction vessel and a second reaction vessel was prepared. To each of the first reaction vessel and the second reaction vessel, introduced was an electrolyte containing 1 M LiPF$_6$ dissolved in the organic solvent having the same composition as the organic solvent used for the salt bridge, i.e. organic solvent including ethylene carbonate (EC)/propylene carbonate (PC)/propyl propionate (PP) mixed at a volume ratio of 3/1/6. One side of the salt bridge was allowed to be dipped in the first reaction vessel, and the other side of the salt bridge was allowed to be dipped in the second reaction vessel so that the electrolyte of the first reaction vessel and the electrolyte of the second reaction vessel might be linked to each other by the salt bridge.

The negative electrode to be pre-lithiated, obtained as described above, was cut into an area of 5×5 cm$^2$ and was dipped at least partially in the electrolyte of the first reaction vessel so that it might be wetted sufficiently for 24 hours. In addition, a lithium metal sheet was dipped at least partially in the electrolyte of the second reaction vessel so that it might be wetted sufficiently for 24 hours. In this manner, a pre-lithiation cell (pre-lithiation apparatus) including two reaction vessels having the first reaction vessel and the second vessel was finished, wherein the electrolyte of the first reaction vessel and the electrolyte of the second reaction vessel were linked with each other by the salt bridge, the negative electrode to be pre-lithiated was dipped at least partially in the electrolyte of the first reaction vessel, and the lithium source (lithium metal sheet) capable of supplying lithium ions was dipped at least partially in the electrolyte of the second reaction vessel. Then, a current density of 1 mA/cm$^2$ was applied to the cell to introduce lithium to 25% of the theoretical capacity of the negative electrode to be pre-lithiated. Herein, the cut-off voltage was 0.05 V (vs/Li/Li$^+$). In addition, when the voltage reached the above-defined value, the charging condition was set at a constant voltage of 0.05 V. When the voltage is decreased from the above-defined value, lithium plating may occur over the whole region, and the current value becomes lower than 1 mA/cm$^2$ due to the constant voltage. Therefore, a longer time is required to obtain the same capacity. The salt on the surface of the pre-lithiated negative electrode was removed through washing with dimethyl carbonate or ethyl methyl carbonate to obtain a pre-lithiated negative electrode.

<Manufacture of Lithium Secondary Battery>

A coin-type battery was manufactured by using the pre-lithiated negative electrode obtained as described above and a counter electrode, i.e. positive electrode using LiCoO$_2$ as a positive electrode active material. The electrolyte used for the lithium secondary battery has the same composition as the electrolyte of the first reaction vessel and the electrolyte of the second reaction vessel.

Example 2

The same pre-lithiation process was carried out in the same manner as Example 1, except that a current density of 2 mA/cm$^2$ was applied.

Comparative Example 1

In one reaction vessel, the negative electrode and the lithium metal sheet as a counter electrode were disposed in such a manner that they might be in contact with each other, without using a salt bridge. In addition, an electrolyte was prepared by dissolving 1 M LiPF$_6$ in an organic solvent including ethylene carbonate (EC)/propylene carbonate (PC) propyl propionate (PP) mixed at a volume ratio of 3/1/6. The electrolyte was introduced to the reaction vessel. Then, a current density of 1 mA/cm$^2$ was applied to the pre-lithiation apparatus to carry out pre-lithiation. A lithium secondary battery was obtained in the same manner as Example 1 by using the pre-lithiated negative electrode.

Comparative Example 2

A pre-lithiated negative electrode and a lithium secondary battery including the negative electrode were obtained in the same manner as Comparative Example 1, except that a current density of 2 mA/cm$^2$ was applied in the pre-lithiation step of Comparative Example 1.

Test Example: Cycle Charge/Discharge Test

Each of the coin-type lithium secondary batteries according to Examples 1 and 2 and Comparative Examples 1 and 2 was determined for its cycle characteristics by using an electrochemical charger. The battery was charged to 4.45 V (vs. Li/Li$^+$) and discharged to 3.0 V (vs. Li/Li$^+$) at a current density of 0.1 C up to the third cycle. From the fourth cycle, charge/discharge was carried out at a current density of 0.5 C under the same voltage condition.

TABLE 1

| | Pre-lithiation process | Current density during Charge | Initial coulombic efficiency (%) | Capacity retention at 100$^{th}$ cycle (%) |
|---|---|---|---|---|
| Ex. 1 | Salt bridge used | 1 mA/cm$^2$ | 98 | 95 |
| Ex. 2 | Salt bridge used | 2 mA/cm$^2$ | 95 | 91 |
| Comp. Ex. 1 | One reaction vessel used | 1 mA/cm$^2$ | 81 | 61 |
| Comp. Ex. 2 | One reaction vessel used | 2 mA/cm$^2$ | 79 | 52 |

It can be seen that each of the lithium secondary batteries according to Examples 1 and 2 shows a higher initial coulombic efficiency and higher capacity retention at the 100$^{th}$ cycle, as compared to each of the lithium secondary batteries according to Comparative Examples 1 and 2. In the case of Comparative Examples 1 and 2, it is shown that each battery shows a significantly reduced initial coulombic efficiency and cycle capacity at the 100th cycle. It is thought that this is because the lithium metal sheet is in contact with the negative electrode in one reaction vessel, and propyl propionate (PP) in the electrolyte reacts with lithium to produce byproducts, which, in turn, causes side reactions during the charge/discharge of the lithium secondary battery.

What is claimed is:

1. A pre-lithiation apparatus, which comprises:
   a first reaction vessel comprising a first electrolyte and a first organic solvent; and
   a second reaction vessel comprising a second electrolyte and a second organic solvent,
   wherein the first electrolyte of the first reaction vessel and the second electrolyte of the second reaction vessel are linked to each other by a salt bridge,
   wherein the salt bridge comprises a third electrolyte and a third organic solvent,
   wherein a negative electrode to be pre-lithiated is dipped at least partially in the first electrolyte of the first reaction vessel, and a lithium source capable of supplying lithium ions is dipped at least partially in the second electrolyte of the second reaction vessel, and the first electrolyte of the first reaction vessel and the second electrolyte of the second reaction vessel include a lithium salt, wherein a total ion concentration of the salt bridge is higher than a total ion concentration of the first electrolyte of the first reaction vessel and the second electrolyte of the second reaction vessel, wherein the lithium source is at least one of a lithium metal sheet or lithium metal powder, and wherein the lithium salt is $LiBF_4$, $LiPF_6$, LiFSI, LiTFSI, $LiCF_3SO_3$, $LiCF_3CO_2$, $LiAsF_6$, $LiSbF_6$ or a mixture of two or more of them.

2. The pre-lithiation apparatus according to claim 1, wherein the electrolyte of the salt bridge has a concentration of from 3 M to 50 M.

3. The pre-lithiation apparatus according to claim 1, wherein the third organic solvent has the same composition as at least one of the first organic solvent contained in the first reaction vessel or the second organic solvent contained in the second reaction vessel.

4. The pre-lithiation apparatus according to claim 1, wherein the salt bridge comprises a glass tube filled with the third organic solvent and the third electrolyte, wherein the third organic solvent and the third electrolyte are gelled with agar.

5. The pre-lithiation apparatus according to claim 1, wherein the third electrolyte is at least one of KCl, NaCl, $KNO_3$ or $Na_2SO_4$.

6. The pre-lithiation apparatus according to claim 1, wherein the salt bridge has an ion conductivity of 5 mS/cm to 10 mS/cm.

7. The pre-lithiation apparatus according to claim 1, wherein at least one of the first electrolyte of the first reaction vessel and the second electrolyte of the second reaction vessel comprises propyl propionate.

8. A negative electrode for a lithium secondary battery obtained by using the pre-lithiation apparatus as defined in claim 1.

9. The pre-lithiation apparatus according to claim 1, wherein the lithium salt comprises $LiBF_4$.

10. The pre-lithiation apparatus according to claim 1, wherein the lithium salt comprises $LiPF_6$.

11. The pre-lithiation apparatus according to claim 1, wherein the lithium salt comprises LiFSI.

12. The pre-lithiation apparatus according to claim 1, wherein the lithium salt comprises LiTFSI.

13. The pre-lithiation apparatus according to claim 1, wherein the lithium salt comprises $LiCF_3SO_3$.

14. The pre-lithiation apparatus according to claim 1, wherein the lithium salt comprises $LiCF_3CO_2$.

15. The pre-lithiation apparatus according to claim 1, wherein the lithium salt comprises $LiAsF_6$.

16. The pre-lithiation apparatus according to claim 1, wherein the lithium salt comprises $LiSbF_6$.

* * * * *